| United States Patent [19] | [11] | 4,385,589 |
|---|---|---|
| Knowles et al. | [45] | May 31, 1983 |

[54] METHOD OF PREVENTING THE NORMAL REVERSION OF SALMON SMOLT AND THE LIKE IN FRESH WATER BACK TO PARR CHARACTERISTICS, AND FOR EFFECTIVELY IMBUING SEA SALMON WITH LAND-LOCKED SALMON CHARACTERISTICS

[76] Inventors: Albert H. Knowles; Robert H. Rines, both of 13 Spaulding St., Concord, N.H. 03301

[21] Appl. No.: 334,742

[22] Filed: Dec. 28, 1981

[51] Int. Cl.³ .............................................. A01K 61/00
[52] U.S. Cl. ...................................................... 119/3
[58] Field of Search ............................................. 119/3

[56] References Cited
U.S. PATENT DOCUMENTS 3,572,291  3/1971  Cavanagh .................................. 119/3

*Primary Examiner*—Hugh R. Chamblee
*Attorney, Agent, or Firm*—Rines and Rines, Shapiro and Shapiro

[57] ABSTRACT

This disclosure is concerned with applications of the discovery that the normal reversion of fresh-water-developed sea-type salmon smolt back to parr, usually within several weeks of smolting, can be prevented, and at the very least significantly retarded, by not removing the smolt to salt water, but by maintaining the same in dark volumes of fresh water with external contrastedly illuminated feed zones(s) to hold the fish in a continual smolt condition with continuing growth and without reversion to parr characteristics; and in some applications, effectively rapidly converting sea-type salmon to, or imbuing the same with, land-locked salmon characteristics.

3 Claims, No Drawings

METHOD OF PREVENTING THE NORMAL REVERSION OF SALMON SMOLT AND THE LIKE IN FRESH WATER BACK TO PARR CHARACTERISTICS, AND FOR EFFECTIVELY IMBUING SEA SALMON WITH LAND-LOCKED SALMON CHARACTERISTICS

The present invention relates to methods of fish farming, being more particularly concerned with the extension of the normal limited period of time that certain sea-type salmon and the like remain in fresh water in a smolt condition, suitable for introduction into the sea, by preventing reversion to parr characteristics; and in certain applications, in effect, rapidly converting sea-type salmon into exhibiting the characteristics of land-locked type salmon.

Sea-type salmon such as, for example, Atlantic salmon (*Salmo Salar*) and coho salmon (*Oncorhynchus Kisutch*) return, in nature, from the salt water to fresh water rivers to spawn, and thereby generate fresh water fry that, within generally a two-year period or so, pass through the parr development stage and become smolt, in which state they are then suitable for return to the sea for salt-water maturation. The window or time period of the fish remaining smoltified is, however, quite limited—usually just several weeks for the Atlantic salmon. When this process is simulated by man in hatcheries, similarly, the same limited period or window of smoltification exists, such that if the smolt are not seasonably introduced to sea water, they revert back to parr characteristics, unsuited for salt water survival and growth and requiring another year of freshwater life as parr before another smolting can occur.

Outward manifestations of the conversion from the parr to the smolt stage, where nature conditions the fish for the new salt-water environment, are the loss of parr spot or stripe markings, the turning silvery and hardening of the skin, the osmotic adaptations for a salt water environment including gill and kidney adaptation, and the stretching or lengthening and thinning of the fish into a streamlined form with pointed heads and tails. In this changed or smoltified condition, the fresh-water-grown fish is, for the limited time it remains as a smolt, ready for the stress and shock of introduction into salt water and subsequent life therein. Absent such introduction within the window period, however, the fish reverts back to its parr characteristics, regaining spots or stripes, losing the silver color and becoming dull or lead-color and darker, easily losing scales, and losing the streamlining, while fattening out with rounding of the heads and tails. Depending on husbandry skills, from 5% to 30% or more die; and with the remainder, one must await another year of fresh-water life for the smolting process to re-occur.

Apart from other considerations, this means that smolt of particular species are only available for one short time during the year—a serious and limiting obstacle heretofore endured by the fish-farming industry concerned with, for example, Atlantic salmon.

An object of the present invention, therefore, is to provide a novel method of preventing the normal reversion of such salmon smolt and the like in fresh water back to parr characteristics, and retaining the fish in fresh water but in continual smoltified condition, for use at desired times of introduction into the sea water.

A further object is to provide a method of very accelerated effective imbuing of sea salmon and the like with land-locked salmon characteristics—a process that probably took nature decades if not centuries to accomplish.

Other and further objects are explained hereinafter and are more particularly delineated in the appended claims.

In summary, however, from one of its viewpoints, the invention embraces a method of preventing the normal reversion of salmon smolt and the like in fresh water back to parr characteristics, that comprises, rearing the salmon in fresh water from the parr stage until they develop the characteristics of smolt, suitable for introduction into salt water generally within a limited period of time, absent which introduction they generally revert back to parr characteristics unsuitable for salt water survival and growth; placing the smolt in a dark volume of fresh water embracing preferably the major portion of a pond or other volume and from which direct and indirect light is substantially excluded, but with sharply contrastingly illuminated zones adjacent but external to said dark volume; producing water current within said volume; and maintaining the smolt in the dark volume current while introducing feed from time to time into the illuminated zones, thereby holding the fish in a continual smolt characteristic condition with continuing growth and without reversion to parr characteristics.

From another viewpoint, the invention provides a method of effectively converting sea-type salmon and the like to, or imbuing them with characteristics of, land-locked types; in particular, the land-locked salmon characteristic that once grown to the "smolt" stage (or size or age corresponding to where their sea "cousins" would turn to smolt), the fish apparently continue to hold their "smolt"-appearing characteristics permanently as they continue fresh-water maturation in lakes and other fresh-bodies.

The invention will now be described with detail of best modes of its practice, it being considered that drawings are not necessary to a clear exposition of the same in the light of the nature of the method and the adequacy of written description.

In our previous U.S. Pat. Nos. 4,271,788 and 4,287,852, techniques are described for accelerating the smolting process, and fish growth and/or density increase, with the aid of light-opaque water-contacting shields or covers extending over the substantial surface of the pond or other holding space to define a dark volume thereunder from which direct and indirect light are effectively substantially excluded and in which the fry and parr are conditioned to live, only darting out into external sharply contrastedly illuminated feed regions or zones for food, and returning to the security of the dark volume.

It has been accidentally discovered, however, that by not removing the fish, once they have smolted, to the sea water for maturation, as taught in said patents, but deliberately maintaining the smolt in the dark volume, while continuing water current thereabout for the smolt to exercise, and continuing the application of feed, from time to time, in the external illuminated zone(s), the fish startlingly are prevented from reverting to parr characteristics. They thereafter, under continuation of substantially the same operating conditions, apparently indefinitely remain and continue to grow as smolt, available at any time to be taken to the sea—with revolutionary results of significant economic importance to fish farming.

In effect, the practice of the invention also seems to have stumbled upon an accelerated technique for converting sea-type salmon to, or imbuing them with, characteristics of land-locked type salmon (in particular, lack of reversion to parr characteristics), and in an extremely short time period, as compared with the evolutionary period that nature required to develop land-locked salmon from sea salmon.

In the case of the before-mentioned sea-type Atlantic salmon, the window or limited time period that smolt can generally be held as smolt in fresh water, prior to reversion to the parr stage, as before described, is of the order of about three weeks. In Northern Scotland, for example, with river water in the temperature range of about 8.5° to 10° C., this may occur in the first weeks of August.

In New Hampshire, U.S.A., with water temperatures of about 48° to 52° F., the smolt window is about three weeks, consistent with the United Kingdom experience.

Using the method of the invention in New Hampshire, under the same temperature conditions, Atlantic sea-type parr (St. Johns River—Pennobscott Bay) first started smolting in July; and with the invention, have continually remained as smolt and have continued growth as smolt to an average of 12.5 cm, 25 gm., in early December 1981, and with no signs of tendency of reversion. In this posture, they have acquired effectively the permanent "smolt" posture of Atlantic land-locked salmon.

Also in New Hampshire, under the above conditions, the normal coho salmon smolt window is also about two-to-three weeks, with coho smolt reverting to parr characteristics when not introduced during the window period into salt water. With the invention, however, smolting first occurred in July 1981 from fry feeding in May, with water temperature about 48°–52° C., and the coho have continued with the method of the invention to grow as smolt (from 13.5 cm, 30 gm. to 19 cm, 75 gm), without a single detectable sign of reversion in over about 15,000 fish, through early December 1981.

While the invention has been described in connection with particular salmon species, in view of the long experience in the art with the similar behavior of other salmonoids, including trout, and related fish of similar characteristics (and the like), it appears that the invention is more generically useful—such and other modifications that will suggest themselves to those skilled in this art being considered to fall within the spirit and scope of the invention as defined in the appended claims.

What is claimed is:

1. In a method of raising salmon and the like in fresh water, that comprises, rearing the salmon in fresh water from the parr stage until they develop the characteristics of smolt, suitable for introduction into salt water generally within a limited period of time, and absent which introduction they would following said period generally revert back to parr characteristics unsuitable for salt water survival and growth; the improvement comprising preventing the smolt from reverting to parr by maintaining the smolt at least through said period in a dark volume of fresh water from which direct and indirect light is substantially excluded, but with sharply contrasting illuminated zones adjacent and external to said dark volume; producing water current within said volume; and introducing feed from time to time into the illuminated zones, thereby holding the fish in a continual smolt characteristic condition with continuing growth.

2. A method as claimed in claim 1 and in which said salmon smolt and the like are sea-type salmon such as Atlantic salmon and the like, and the fish maintained held in the continual smolt condition are ready at any desired time(s) for introduction into salt water for subsequent maturation.

3. A method of effectively imbuing sea-type salmon and the like with characteristics of land-locked types, that comprises, rearing the sea-type salmon in fresh water holding space from the parr stage until they develop the characteristics of smolt, suitable for introduction into salt water generally within a limited period of time, absent which introduction they would following said period generally revert back to parr characteristics unsuitable for salt water survival and growth; maintaining the smolt at least through said period in a dark volume extending over a substantial portion of the fresh water holding space from which dark volume direct and indirect light is substantially excluded, but with sharply contrasting illuminated zones adjacent to said dark volume; providing water current within said volume; and introducing feed from time to time into the illuminated zones, thus holding the fish in a continual smolt characteristic condition with continuing growth and without reversion to parr characteristics, thereby effectively creating characteristics of the land-locked type salmon.

* * * * *